United States Patent
Dooley et al.

(10) Patent No.: US 7,752,354 B2
(45) Date of Patent: Jul. 6, 2010

(54) AUXILIARY MECHANISM TO MANAGE INSTRUCTION RESTART AND RESTART COMING IN A LOOKAHEAD PROCESSOR

(75) Inventors: Miles Robert Dooley, Austin, TX (US); Joaquin Hinojosa, Round Rock, TX (US); Bruce Joseph Ronchetti, Austin, TX (US); Anthony Saporito, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 701 days.

(21) Appl. No.: 11/055,844

(22) Filed: Feb. 11, 2005

(65) Prior Publication Data

US 2006/0184822 A1 Aug. 17, 2006

(51) Int. Cl.
*G06F 3/00* (2006.01)
*G06F 12/00* (2006.01)

(52) U.S. Cl. .......................... 710/51; 711/166
(58) Field of Classification Search .................. 710/36; 711/166
See application file for complete search history.

(56) References Cited

U.S. PATENT DOCUMENTS

| | | | |
|---|---|---|---|
| 5,025,366 A * | 6/1991 | Baror | 711/128 |
| 5,353,426 A * | 10/1994 | Patel et al. | 711/118 |
| 5,737,604 A * | 4/1998 | Miller et al. | 713/1 |
| 5,768,500 A * | 6/1998 | Agrawal et al. | 714/47 |
| 5,870,602 A * | 2/1999 | Miller et al. | 713/1 |
| 5,958,041 A | 9/1999 | Petolino, Jr. et al. | |
| 5,987,594 A | 11/1999 | Panwar et al. | |
| 6,088,788 A | 7/2000 | Borkenhagen et al. | |
| 6,754,808 B1 | 6/2004 | Roth et al. | |
| 7,203,799 B1 * | 4/2007 | Ball | 711/125 |
| 2006/0179264 A1 | 8/2006 | Hinojosa et al. | |

OTHER PUBLICATIONS

Frommer et al., Mechanism in a Multi-Threaded Microprocessor to Maintain Best Case Demand Instruction Redispatch.
Dooley et al., Lookahead Mode Sequencer.
Tullsen et al., "Simultaneous Multithreading: Maximizing On-Chip Parallelism", pp. 533-544, 1995, ACM, WA.
Llena, "Recovery Mechanisms for Latency Mispredictions", Address Predications and Recovery Mechanisms, May 2002, pp. 149-178, Barcelona, Spain.

* cited by examiner

*Primary Examiner*—Henry W. H. Tsai
*Assistant Examiner*—Titus Wong
(74) *Attorney, Agent, or Firm*—Yee & Associates, P.C.; Diana R. Gerhardt

(57) ABSTRACT

A management system that controls a restart interface in a data processing system. The management system switches control of the interface from a distributed network managed by the caches to the management system. The management system is capable of detecting errors and seizing control of the interface in order to remedy any errors that occur within the interface.

19 Claims, 6 Drawing Sheets

US 7,752,354 B2

AUXILIARY MECHANISM TO MANAGE INSTRUCTION RESTART AND RESTART COMING IN A LOOKAHEAD PROCESSOR

CROSS REFERENCE TO RELATED APPLICATIONS

The present invention is related to an application entitled "Mechanism In A Multi-Threaded Microprocessor To Maintain Best Case Demand Instruction Redispatch", U.S. patent application Ser. No. 11/055,818, and entitled "Lookahead Mode Sequencer", U.S. patent application Ser. No. 11/055,862, filed even date hereof, assigned to the same assignee, and incorporated herein by reference.

BACKGROUND OF THE INVENTION

1. Technical Field

The present invention relates generally to an improved data processing system, and in particular to a method and apparatus for processing data. Still more particularly, the invention relates to mechanisms for managing the restart interface in a lookahead processor.

2. Description of Related Art

In a processor that implements load lookahead instruction processing, instructions that miss the translation cache or the data cache are held for redispatch until a restart signal is activated. This mechanism is augmented by using a restart coming signal, which informs the restart mechanism that a restart signal will be forthcoming. Under normal operation, when the appropriate storage interface response is received, the restart signals are driven by either the translation cache control macros or the data cache control macros. The decision to use the translation cache control macros or the data cache control macros depends upon where a miss occurred during the processing of an instruction. Using the translation cache control macros and data cache control macros to manage misses minimizes the impact of a miss, because the missing instruction may be redispatched at the earliest possible cycle in which the miss can be resolved.

However, the rules governing the interface between the load-store unit and the instruction dispatch unit are complex. Errors could arise in the form of soft errors or in the form of unforeseen timing interactions with the memory subsystem. Any errors that take place on the interface have the potential to cause the data processing system to hang. Thus, it is desirable to have a mechanism in place to remedy any errors that occur.

SUMMARY OF THE INVENTION

The present invention provides a method, apparatus and algorithm for a management system that controls a restart interface in a data processing system. The management system switches control of the interface from a distributed network managed by the cache control macros to the management system. The management system is capable of detecting errors and seizing control of the interface in order to remedy any errors that occur on the interface.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
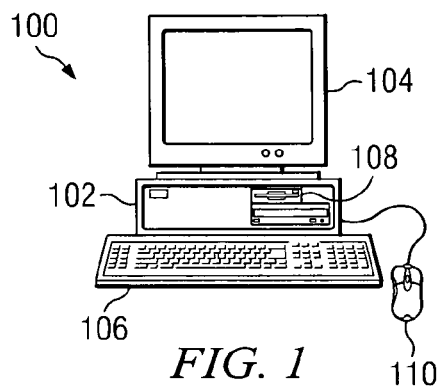
FIG. 1 is a pictorial representation of a data processing system in which the present invention may be implemented.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
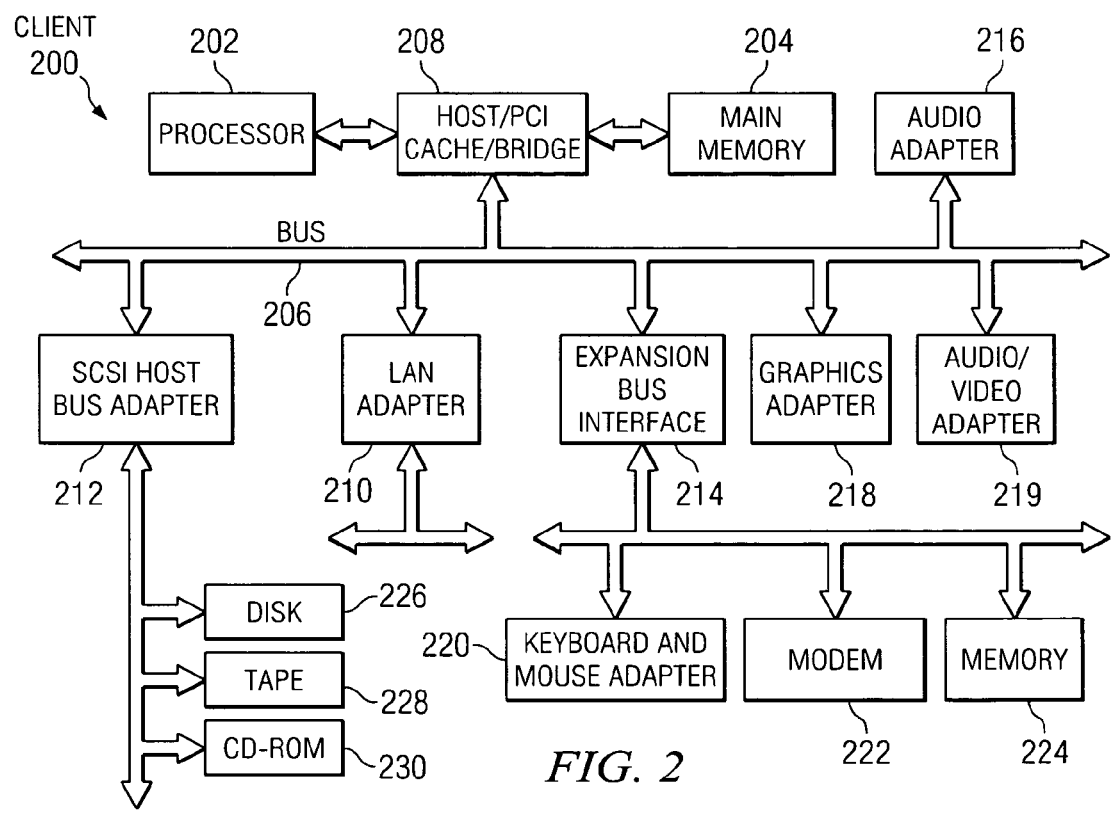
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors. In the depicted example, local area network (LAN) adapter 210, small computer system interface (SCSI) host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

The present invention provides a method, apparatus and algorithm for a management system that controls a restart interface in a data processing system. The management system switches control of the interface from a distributed network managed by the cache control macros to the management system. The management system is capable of detecting errors and seizing control of the interface in order to remedy any errors that occur on the interface.

The management system takes as input the translation cache and data cache miss signals. When a demand miss is detected, the management system will recognize that a restart signal must be driven once the data has been returned. The management system waits a number of cycles and transmits the restart signal in accordance with the rules governing the interface. If the data has been returned in the intervening time, then the instruction will no longer miss the cache and will be completed. If the data has not yet been returned, the instruction misses the cache and the process repeats. Eventually, the data will be returned and the instruction will be completed.

Figure 3:
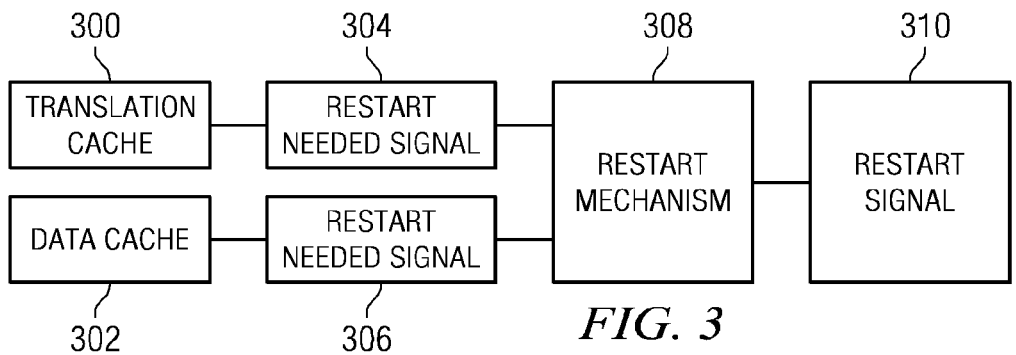
FIG. 3 shows a block diagram of a restart mechanism controlled by translation cache control macros and data cache control macros, in accordance with a preferred embodiment of the present invention.

FIG. 3 shows a block diagram of a cache restart mechanism 308 controlled by translation cache control macros 300 and data cache control macros 302, in accordance with a preferred embodiment of the present invention. The restart mechanism may be implemented in a processor, such as processor 202 in FIG. 2. In the mechanism shown in FIG. 3, translation cache control macros 300 and data cache control macros 302 directly control restart mechanism 308.

A restart signal is needed when an instruction has missed either of the caches. An instruction has missed a cache when requested data is not resident in the data cache or when an address translation is not resident in the translation cache. Missing the cache causes instruction processing to be suspended until the required data can be supplied.

Thus, if a restart is needed because an instruction has missed either of the caches, or because of some other reason, then the translation cache control macros or the data cache control macros transmit a signal, 304 or 306 respectively, to the restart mechanism 308 that a restart is needed. This restart signal is sent once the required data has been loaded into the cache. The restart mechanism then provides the restart signal 310 to a dispatch unit. The dispatch unit will then re-dispatch the original instruction which missed the cache. With the required data now resident in the cache, instruction processing is able to resume.

The dispatch unit is responsible for dispatching instructions to all other functional units in the processor, such as the fixed point unit, the floating point unit, the load store unit, and other functional units. The fixed point unit handles fixed point arithmetic, the floating point unit handles floating point arithmetic, and the load store unit is responsible for interfacing to memory and handling all load and store operations to bring data into the processor or to write data back to the memory.

When a load instruction misses the cache, a reject signal is sent to the dispatch unit. In response to this notification, the dispatch unit will try to send that same instruction back to the load store unit once the restart signal is received. Meanwhile, forward progress of the program or set of instructions is suspended while waiting for the restart signal.

In the processor described herein, load lookahead prefetching is used to speculatively continue processing while waiting for the demand or next to complete instruction's data to be returned from memory. None of the speculative results of the processing are committed to architected state, but future cache misses may be effectively exposed. The future cache misses may then begin processing early in an attempt to reduce the total execution time of the program. When the demand instruction is restarted, data may have already been brought into the cache for the next instruction in the program while execution was suspended. Otherwise, another cache miss would occur and additional time would be spent waiting while the program suspended again, further delaying processing.

Figure 4:
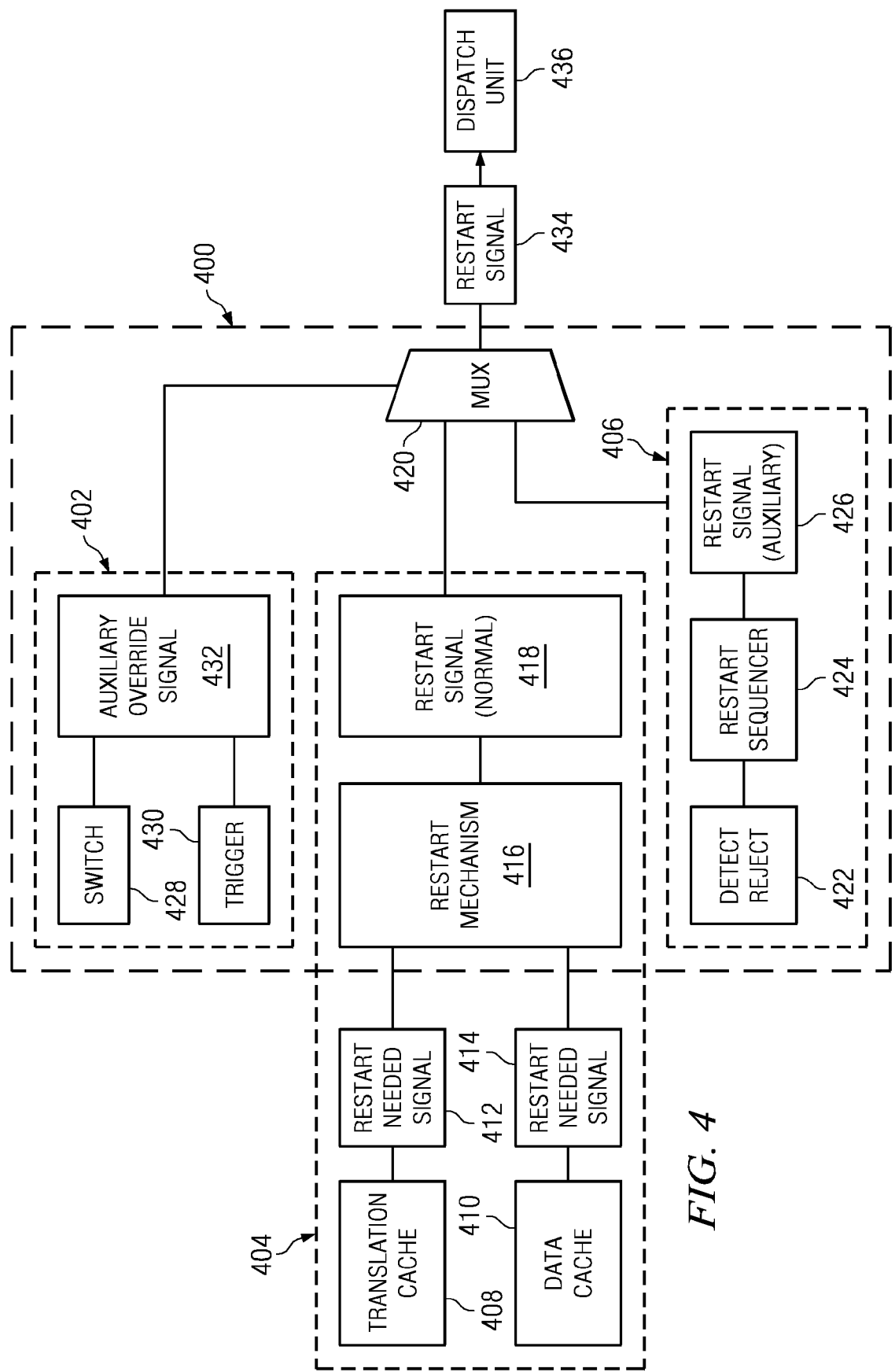
FIG. 4 shows a block diagram of a restart mechanism controlled by a management system, in accordance with a preferred embodiment of the present invention.

FIG. 4 shows a block diagram of a restart mechanism controlled by a management system 400, in accordance with a preferred embodiment of the present invention. The restart mechanism may be implemented in a processor, such as processor 202 in FIG. 2. Management system 400 may be considered as having three other components, override system 402, cache restart control system 404, and auxiliary restart control system 406. Override system 402 controls whether cache restart control system 404 will be used to restart a set of instructions or the auxiliary restart mechanism will be used to restart a set of instructions.

Override system 402 may cause auxiliary override signal 432 to be sent to multiplexer (MUX) 420 if either switch 428 is actuated or if trigger 430 is triggered. In turn, multiplexer 420 allows auxiliary restart control system 406 to control whether restart signal 434 is transmitted to the dispatch unit 436. In the illustrative embodiment, cache restart control system 404 no longer controls whether restart signal 434 is sent. In addition, management system 400 recognizes which instructions are demand instructions and which instructions are lookahead instructions. When a demand instruction misses one of the caches, management system 400 will recognize that a restart signal must be driven once the data has been returned.

In an illustrative embodiment, switch 428 is a static switch, such as an L1, L2 scan-only latch used to form a flip-flop, that is set during boot-up. If switch 428 is on, then auxiliary override signal 432 will always be sent, meaning that auxiliary restart control system 406 will always control whether restart signal 434 is sent. If switch 428 is off, then trigger 430 may still cause override signal 432 to be sent to multiplexer 420. Although in the preceding illustrative embodiment, switch 428 is a static switch, switch 428 may be implemented using any suitable switch.

In an illustrative embodiment, trigger 430 may be an external debug command, a work-around trigger, a level trigger, an internal restart sequence trigger, or some other macro. If trigger 430 is triggered, then the trigger causes auxiliary override signal 432 to be sent to multiplexer 420. In turn, multiplexer 420 causes auxiliary restart control system 406 to control whether restart signal 434 is transmitted to dispatch unit 436. In the illustrative embodiment, cache restart control system 404 no longer controls whether restart signal 434 is sent.

If override system 402 does not send auxiliary override signal 432 to multiplexer 420, then cache restart control system 404 controls whether restart signal 434 is sent to dispatch unit 436. In this case, cache restart control system 404 operates as does the restart control system described with respect to FIG. 3. In this case, translation cache control macros 408 corresponds to translation cache control macros 300, data cache control macros 410 corresponds to data cache control macros 302, restart needed signal 412 corresponds to restart needed signal 304, restart needed signal 414 corresponds to restart needed signal 306, restart mechanism 416 corresponds to restart mechanism 308, and restart signal 418 corresponds to restart signal 310.

If override system 402 does send auxiliary override signal 432 to multiplexer 420, then auxiliary restart control system 406 controls whether restart signal 434 is sent to dispatch unit 436. If auxiliary control system 406 detects a cache miss type reject 422 for a demand instruction, then restart sequencer 424 sends auxiliary restart signal 426 to multiplexer 420. In turn, multiplexer 420 sends restart signal 434 to dispatch unit 436. Thus, auxiliary restart sequencer 424 controls whether restart signal 434 is sent.

FIG. 5 through FIG. 8 show flowcharts illustrating the operation of the management system shown in FIG. 4. In the following descriptions of FIG. 5 through FIG. 8, item numbers between 400 and 436 refer to blocks described in FIG. 4. The methods, apparatus, and algorithms shown in FIG. 5 through FIG. 8 may be implemented in data processing system 200 and more particularly in processor 202, both shown in FIG. 2.

Figure 5:
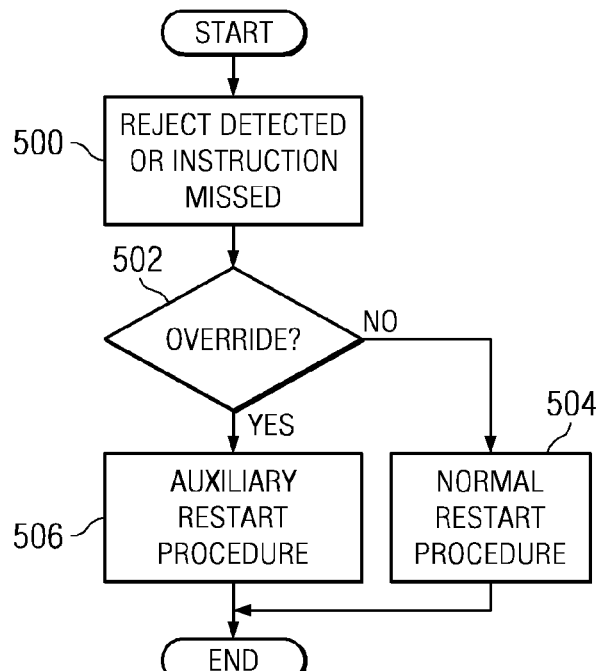
FIG. 5 is a flowchart illustrating the operation of the management system shown in FIG. 4, in accordance with a preferred embodiment of the present invention.

FIG. 5 is a flowchart illustrating the operation of the management system shown in FIG. 4, in accordance with a preferred embodiment of the present invention. In the following description of FIG. 5, elements such as the management system, override control system, cache restart control system, and auxiliary restart control system may be corresponding systems 400, 402, 404, and 406 shown in FIG. 4.

First, a reject signal or signal representing an instruction which missed one of the caches is detected (step 500). A determination is then made whether the override control system will cause the auxiliary restart control system to control the restart procedure or the cache restart control system to control the restart procedure (step 502). If the cache restart procedure will be used, then the multiplexer allows the cache restart control system to control the restart procedure (step 504), with the process terminating thereafter. If the auxiliary restart procedure will be used, then the multiplexer allows the auxiliary restart control system to control the restart procedure (step 506), with the process terminating thereafter.

Figure 6:
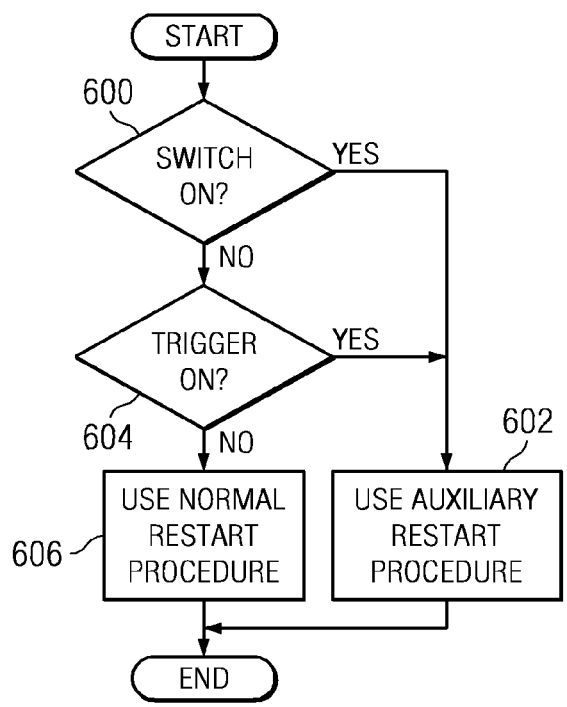
FIG. 6 is a flowchart illustrating the override step shown in FIG. 5, in accordance with a preferred embodiment of the present invention.

FIG. 6 is a flowchart illustrating override step 502 shown in FIG. 5, in accordance with a preferred embodiment of the present invention. First, a determination is made whether switch 428 is actuated (step 600). If switch 428 is actuated, then the auxiliary restart procedure is used (step 602). If switch 428 is not actuated, then a determination is made whether trigger 430 has been triggered (step 604). If trigger 430 has been triggered, then the auxiliary restart procedure is used (step 602). If trigger 430 has not been triggered, then the cache restart procedure is used (step 606). The process shown in FIG. 6 terminates, though the selected restart procedure continues.

Figure 7:
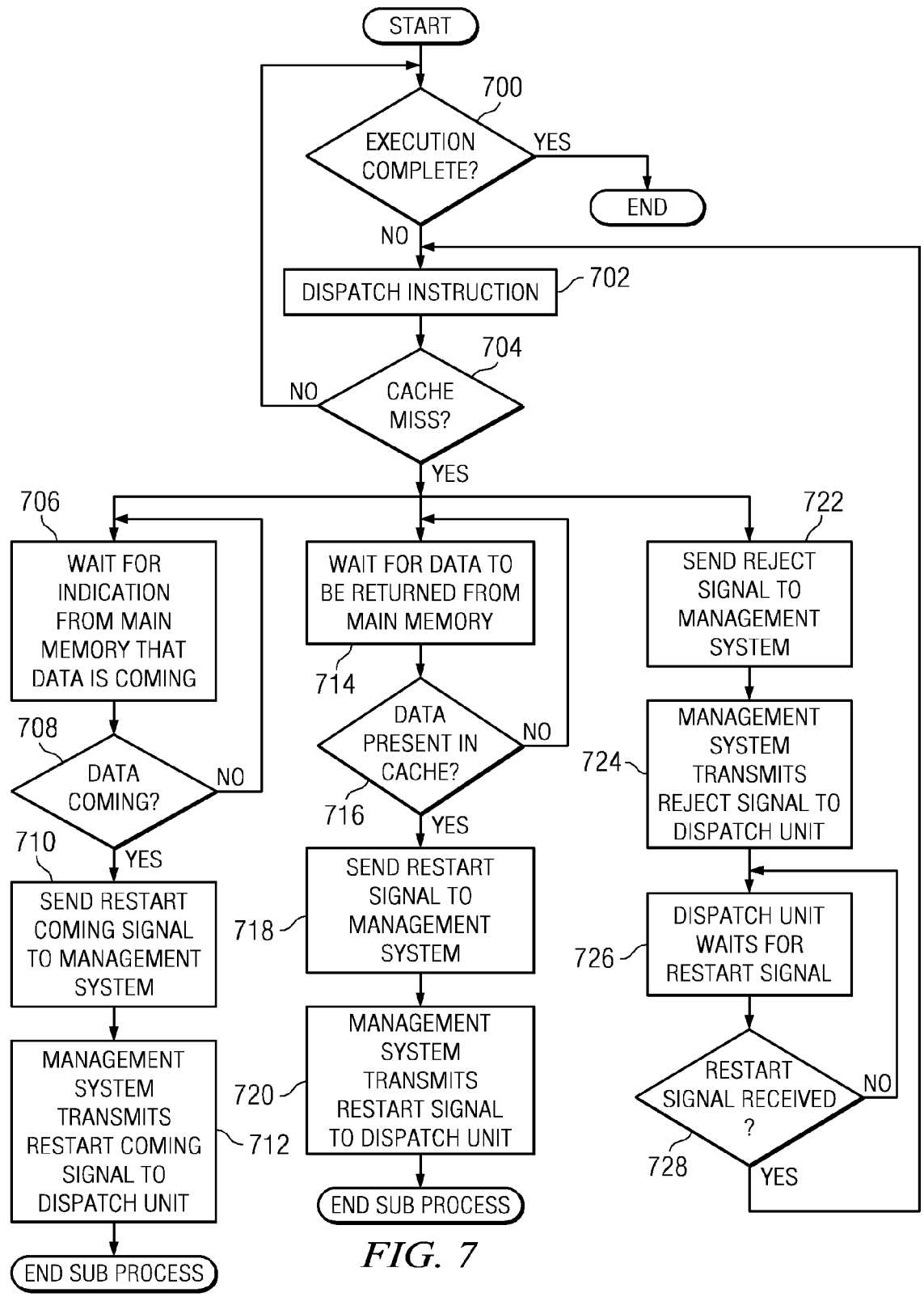
FIG. 7 is a flowchart illustrating the cache restart procedure step in FIG. 5, in accordance with a preferred embodiment of the present invention.

FIG. 7 is a flowchart illustrating the cache restart procedure step (504) in FIG. 5, in accordance with a preferred embodiment of the present invention. The method shown in FIG. 7 describes operation of a restart procedure with respect to an instruction missing the data cache and the translation cache. In the normal restart procedures shown in FIG. 7, a central manager acts as a conduit to pass the restart coming and restart signals through to the dispatch unit. The cache control macros for both types of caches detect a miss and send a reject to the central manager. Some handshaking occurs between the cache control macros such that each knows which should control a particular restart. If an instruction misses both caches, then in an illustrative embodiment the translation cache has higher priority and will drive the restart signals. The data cache control macro will wait for the translation miss to be resolved before driving any restart signals.

After detecting a miss, the appropriate cache control macro then waits for the data to be returned. When the appropriate cache control macro detects that data is about to be returned, the appropriate cache control macro sends a restart coming signal. Then, when data is available in a cache, the appropriate control macro sends the restart signal. The timing of this process is preselected such that the missed instruction is redispatched at the earliest possible cycle in which it can arrive at the cache and successfully complete.

Turning back to FIG. 7, the process begins with a determination whether execution of the program or set of instructions is complete (step 700). If execution is complete, then the process terminates. If execution is not complete, then the instruction at issue is dispatched to the relevant cache (step 702). Next, the relevant cache is monitored for whether an instruction misses the relevant cache (step 704). If the instruction does not miss the relevant cache, then the process returns to step 700 and execution of the set of instructions continues.

If an instruction does miss the relevant cache, then the relevant cache control macro simultaneously performs three functions. The relevant cache control macro waits for an indication from the main memory that data is coming (step 706), waits for data to be returned from main memory (step 714) and sends a reject signal to a management system, such as management system 400 of FIG. 4 (step 722). Each of these three functions forms a sub-process.

The sub-process represented by step 706 begins by the relevant cache control macro waiting for an indication from the main memory that data is coming. A determination is then made whether data is coming into the relevant cache (step 708). If data is not coming into the relevant cache, then the process returns to step 706. If data is coming into the relevant cache, then the relevant cache control macro sends a restart coming signal to the management system (step 710). Thereafter, the management system transmits a restart coming signal to the dispatch unit (step 712). The sub-process represented by steps 706, 708, 710, and 712 then terminates.

Returning to step 714, the relevant cache control macro waits for data to be returned from the main memory. A determination is then made whether data is present in the relevant cache (step 716). If data is not present in the relevant cache, then the process returns to step 714. If data is present in the relevant cache, then a restart signal is sent to the management system, such as management system 400 shown in FIG. 4 (step 718). The management system then transmits a restart signal to the dispatch unit (step 720). The sub-process represented by steps 714, 716, 718, and 720 then terminates.

Returning to step 722, upon an instruction missing the cache (step 704), the relevant cache control macro sends a reject signal to the management system, such as management system 400 shown in FIG. 4 (step 722). The management system then transmits a reject signal to the dispatch unit (step 724). The dispatch unit then waits for a restart signal (step 726).

A determination is then made whether a restart signal sent during step 720 is received (step 728). If the restart signal has not been received, then the process returns to step 726 and the dispatch unit continues to wait for the restart signal. If the restart signal has been received, then the process returns to step 702, wherein an instruction is dispatched to the cache. Assuming that the restart is successful, and that the instruction arrives at the cache after the required data has been stored in the cache, the instruction will no longer miss the cache (step 704). The process then returns again to step 700. The program or set of instructions then continues execution until execution is complete.

Figure 8:
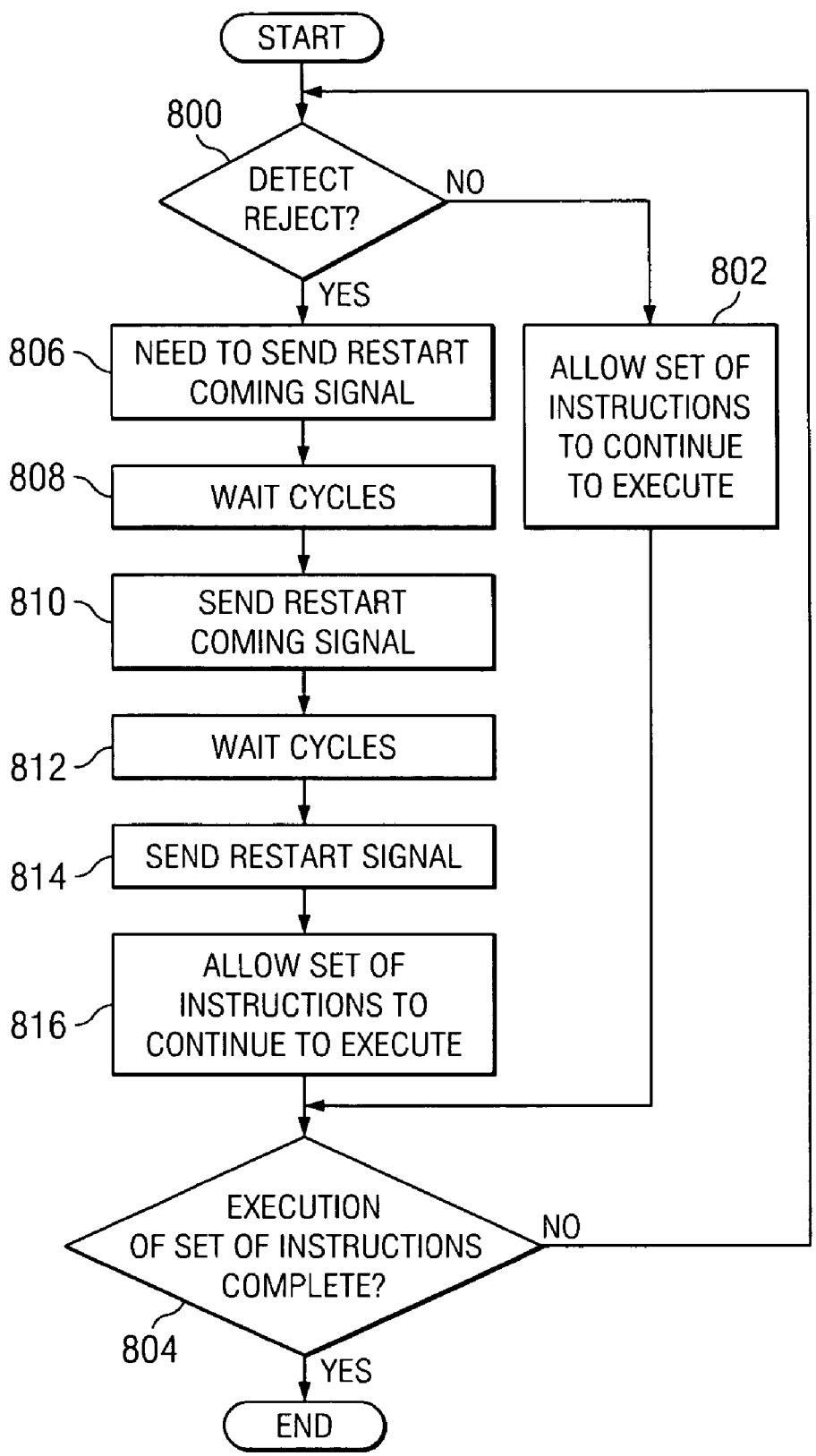
FIG. 8 is a flowchart illustrating the auxiliary restart procedure step in FIG. 5, in accordance with a preferred embodiment of the present invention.

FIG. 8 is a flowchart illustrating the auxiliary restart procedure, step 506 in FIG. 5, in accordance with a preferred embodiment of the present invention. The auxiliary restart procedure is invoked when the cache restart procedure controlled by the translation cache control macros and data cache control macros results in an error or if some other reason is present that requires the use of the auxiliary restart procedure.

The process begins with a determination whether an instruction has missed one of the caches by detecting that a cache miss type reject has occurred on the demand instruction (step 800). If no miss or reject is detected, then the set of instructions is allowed to continue to execute (step 802). Thereafter, a determination is made whether the execution of the set of instructions is complete (step 804). If the execution is complete, the process terminates; otherwise, the process returns to step 800.

Turning back to step 800, if a miss or a reject is detected, then a restart coming signal will be sent to dispatch unit 436 via multiplexer 420 (step 806). However, because the central manager may not track the return of missing data, it may not be possible to send the restart or restart coming signals at the optimum time, as is the case when the translation cache control macros or data cache control macros are driving the restart signals. Thus, a number of predetermined cycles on a processor clock are allowed to pass before the restart coming signal is sent (step 808).

Once the number of predetermined cycles has passed, a restart coming signal is sent to dispatch unit 436 via multiplexer 420 (step 810). In the illustrative embodiment, a number of predetermined cycles are allowed to pass in order to ensure that missing data has been returned (step 812). In an illustrative embodiment, the predetermined number of cycles in step 808 may be graduated, such as three, seven, fifteen, and thirty-one cycles, in order to allow more lookahead work to be done. In another illustrative embodiment, the number of cycles between restart coming and restart is variable in order to avoid potential livelocks that may occur. In this case, the delay is used for fault tolerance.

Thereafter, auxiliary restart signal 426 is sent to multiplexer 420, which then sends restart signal 434 to dispatch unit 436 (step 814). The set of instructions is then allowed to continue to execute (step 816). If the set of instructions has not completed execution, then the process returns to step 800; otherwise, the process terminates (step 804).

Figure 9:
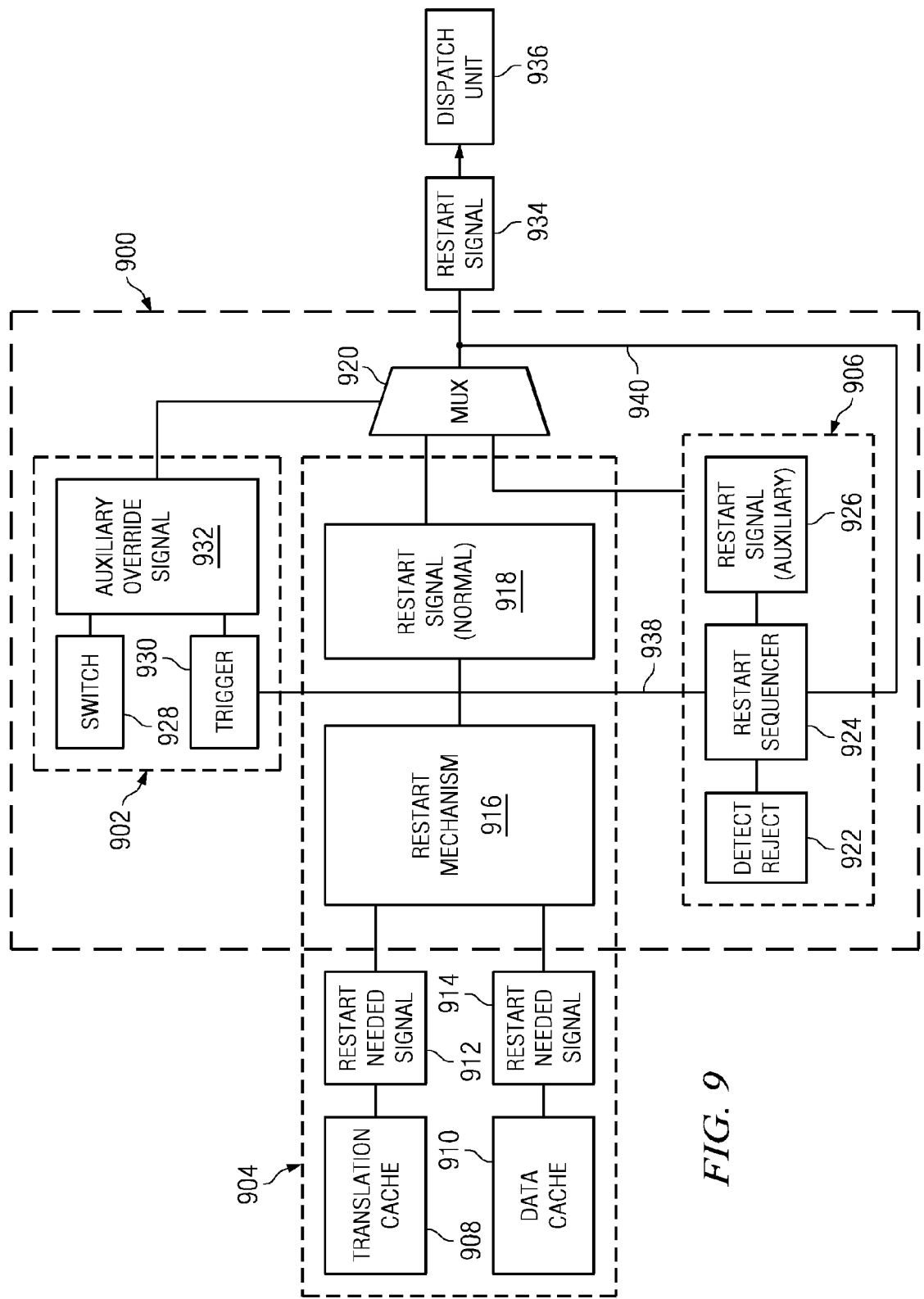
FIG. 9 shows a block diagram of a restart mechanism controlled by an alternative management system, in accordance with a preferred embodiment of the present invention.

FIG. 9 shows a block diagram of a restart mechanism controlled by an alternative management system 900, in accordance with a preferred embodiment of the present invention. The restart mechanism shown in FIG. 9 may be implemented in a processor, such as processor 202 in FIG. 2. Like management system 400 of FIG. 4, management system 900 may be considered as having three other components, override system 902, cache restart control system 904, and auxiliary restart control system 906. Override system 902 controls whether cache restart mechanism 904 will be used to restart a set of instructions or the auxiliary restart mechanism will be used to restart a set of instructions. Item numbers 900, 902, 904, 906, 908, 910, 912, 914, 916, 918, 920, 922, 924, 926, 928, 930, 932, 934, and 936 correspond to item numbers 400, 402, 404, 406, 408, 410, 412, 414, 416, 418, 420, 422, 424, 426, 428, 430, 432, 434, and 436 accordingly, and the boxes shown in FIG. 9 perform similar functions to corresponding boxes shown in FIG. 4.

Although the operation of the mechanism of FIG. 4 is similar to the mechanism of FIG. 9, the restart mechanism shown in FIG. 9 connects restart sequencer 924 to trigger 930 (as shown by line 938) and to the output of multiplexer 920 (as shown by line 940). Thus, restart sequencer 924 may respond to restart signals generated by multiplexer 920.

For example, if cache restart signal 918, generated by restart mechanism 916 and controlled by translation cache control macros 908, data cache control macros 910, and cache restart control system 904, may result in an error, then restart sequencer 924 detects the error more quickly. In turn, restart sequencer 924 transmits a signal to trigger 930 to cause auxiliary override signal 932 to be transmitted to multiplexer 920. As a result, override system 902 triggers multiplexer 920 to allow auxiliary restart control system 906 to control restart signal 934, as described in reference to FIG. 4 through FIG. 8. Thus, the illustrative embodiment shown in FIG. 9 provides for an intelligent trigger for override system 902, which in turn allows alternative management system 900 to respond to errors more quickly.

The present invention provides several advantages over prior restart systems. The management system described in FIG. 4 and FIG. 9 has access to more information than do the distributed caches, and is therefore better equipped to handle errors. In addition, the management system is decoupled from the asynchronous memory subsystem, which removes much of the uncertainty involved with the interface between the load-store unit and the instruction dispatch unit. Furthermore, the present invention is capable of quickly remedying errors that may cause the processor or data processing system to hang. Thus, the present invention is capable of taking control of the interface away from the caches and centralizing control, thereby adding a degree of fault tolerance to the complex interface.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A restart system in a data processing system, said restart system comprising:
   a cache restart control system controlled by at least one cache, said cache restart control system operably connected to a multiplexer;
   an override system capable of generating an auxiliary override signal in response to an input signal, said override system operably connected to the multiplexer;
   an auxiliary restart control system operably connected to the multiplexer;
   wherein the multiplexer transmits a first signal to a dispatch unit in response to a receipt by the multiplexer of one of a second signal transmitted by the cache restart control system and a third signal transmitted by the auxiliary restart control system, and wherein the multiplexer is configured to transmit only the first signal only if the multiplexer receives the auxiliary override signal, and wherein the first signal comprises the third signal, and further wherein one of the second signal and the third signal is transmitted to the multiplexer in response to a cache miss of the at least one cache caused by an instruction, and still further wherein the multiplexer receives as the multiplexer's inputs only the second signal, the third signal, and the auxiliary override signal; and
   re-dispatching, by the dispatch unit, the instruction that missed the at least one cache in response to a receipt by the dispatch unit of the first signal.

2. The restart system of claim 1 wherein the input signal is generated by one of a switch and a trigger.

3. The restart system of claim 2 wherein the trigger is an output of a work-around trigger macro.

4. The restart system of claim 2 wherein the switch is a static switch.

5. The restart system of claim 2 wherein the trigger is a fourth signal generated by the auxiliary restart control system.

6. The restart system of claim 1 wherein the at least one cache comprises a translation cache and a data cache.

7. The restart system of claim 1 wherein the first signal is a restart signal.

8. The restart system of claim 1 wherein the first signal is a restart coming signal.

9. The restart system of claim 1 wherein the second signal is a restart signal.

10. The restart system of claim 1 wherein the second signal is a restart coming signal.

11. The restart system of claim 1 wherein the third signal is a restart signal.

12. The restart system of claim 1 wherein the third signal is a restart coming signal.

13. A method for overriding a cache restart control mechanism that is controlled by at least one cache, the method comprising:
   receiving an auxiliary override signal at a multiplexer in response to a cache miss of the at least one cache caused by an instruction, wherein the auxiliary override signal is generated by an override system connected to the multiplexer, wherein the cache restart control mechanism is also connected to the multiplexer, and wherein the multiplexer is configured to allow only a first signal generated by an auxiliary restart control system to be output from the multiplexer in response to receiving the auxiliary override signal, and further wherein the multiplexer receives as the multiplexer's inputs only a signal transmitted by the cache restart control system, the first signal, and the auxiliary override signal;
   generating the first signal with the auxiliary restart control system;
   transmitting the first signal to the multiplexer;
   outputting the first signal from the multiplexer; and
   re-dispatching, by the dispatch unit, the instruction that missed the at least one cache in response to the multiplexer outputting the first signal.

14. The method of claim 13 wherein the auxiliary override signal is generated by actuation of at least one of a switch and a trigger.

15. The method of claim 13 wherein transmitting the first signal further comprises:
   waiting a first number of cycles on a processor clock;
   transmitting a restart coming signal to the dispatch unit;
   waiting a second number of cycles on the processor clock; and
   transmitting a restart signal to the dispatch unit, wherein the instruction that missed the at least one cache is re-dispatched in response to the dispatch unit receiving the restart signal.

16. A data processing system comprising:
a bus;
a memory operably connected to the bus;
a processor operably connected to the bus;
wherein the processor further comprises:
a translation cache operably connected to a first restart mechanism and a data cache operably connected to the first restart mechanism, wherein the first restart mechanism is operably connected to a multiplexer and wherein a translation cache control macro and a data cache control macro control the restart mechanism;
a trigger operably connected to the multiplexer, said trigger adapted to transmit an override signal to the multiplexer;
an auxiliary restart control system operably connected to the multiplexer;
wherein the multiplexer is configured to transmit one of a first restart signal and a first restart coming signal in response to an input from the first restart mechanism, unless the multiplexer receives the override signal;
wherein the multiplexer is configured to transmit at least one of a second restart signal and a second restart coming signal in response to input from the auxiliary restart control system, if the multiplexer receives the override signal, and wherein the multiplexer is further configured to prevent transmission of the first restart signal and the first restart coming signal if the multiplexer receives the override signal, and further wherein the multiplexer receives as the multiplexer's inputs only the input from the first restart mechanism, the input from the auxiliary restart control system, and the override signal.

17. The data processing system of claim 16 further comprising:
a switch operably connected to the multiplexer, said switch adapted to transmit the override signal to the multiplexer.

18. The data processing system of claim 17 wherein the auxiliary restart control system comprises a restart sequencer.

19. The data processing system of claim 16, wherein the multiplexer receives the input from the first restart mechanism and the input from the auxiliary restart control system in response to a cache miss of one of the translation cache and the data cache caused by an instruction, and further comprising:
a dispatch unit for re-dispatching the instruction in response to the dispatch unit receiving one of the first restart signal and the second restart signal.

* * * * *